United States Patent
Compton et al.

(10) Patent No.: US 7,893,976 B2
(45) Date of Patent: Feb. 22, 2011

(54) LIGHT SENSITIVITY IN IMAGE SENSORS

(75) Inventors: John T. Compton, LeRoy, NY (US);
Michele O'Brien, Rochester, NY (US);
John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1117 days.

(21) Appl. No.: 11/565,687

(22) Filed: Dec. 1, 2006

(65) Prior Publication Data

US 2008/0130073 A1     Jun. 5, 2008

(51) Int. Cl.
*H04N 5/335* (2006.01)
*H04N 9/04* (2006.01)

(52) U.S. Cl. ........................ 348/277; 348/278

(58) Field of Classification Search ......... 348/272–293, 348/222.1, 223.1
See application file for complete search history.

(56) References Cited

U.S. PATENT DOCUMENTS

| | | | |
|---|---|---|---|
| 4,390,895 A | 6/1983 | Sato et al. | |
| 4,437,112 A | 3/1984 | Tanaka et al. | |
| 4,567,510 A * | 1/1986 | Tanaka et al. | 348/273 |
| 4,760,441 A | 7/1988 | Kohno | |
| 4,823,186 A | 4/1989 | Muramatsu | |
| 4,939,573 A * | 7/1990 | Teranishi et al. | 348/276 |
| 5,323,233 A | 6/1994 | Yamagami et al. | |
| 6,326,624 B1 | 12/2001 | Chapuis et al. | |
| 6,476,865 B1 | 11/2002 | Gindele et al. | |
| 6,876,384 B1 * | 4/2005 | Hubina et al. | 348/223.1 |
| 2003/0210332 A1 | 11/2003 | Frame | |
| 2006/0119738 A1 * | 6/2006 | Kido | 348/571 |
| 2007/0076269 A1 * | 4/2007 | Kido et al. | 358/474 |
| 2007/0177236 A1 | 8/2007 | Kijima et al. | |

* cited by examiner

*Primary Examiner*—Nelson D. Hernández Hernández
(74) *Attorney, Agent, or Firm*—Raymond L. Owens

(57) ABSTRACT

An image sensor is disclosed for capturing a color image, comprising a two-dimensional array of pixels having a plurality of minimal repeating unit wherein each repeating unit is composed of eight pixels having five panchromatic pixels and three pixels having different color responses.

7 Claims, 11 Drawing Sheets

| P | G | P | G |
|---|---|---|---|
| R | P | B | P |

FIG. 4
*(PRIOR ART)*

| P | G | P | Q |
|---|---|---|---|
| R | P | B | P |

FIG. 5A

| P | B | P | Q |
|---|---|---|---|
| R | P | G | P |

FIG. 5B

| P | Y | P | Q |
|---|---|---|---|
| C | P | M | P |

FIG. 5C

| P | G | P | Q | P | G | P | Q | P | G | P | Q |
|---|---|---|---|---|---|---|---|---|---|---|---|
| R | P | B | P | R | P | B | P | R | P | B | P |
| P | G | P | Q | P | G | P | Q | P | G | P | Q |
| R | P | B | P | R | P | B | P | R | P | B | P |
| P | G | P | Q | P | G | P | Q | P | G | P | Q |
| R | P | B | P | R | P | B | P | R | P | B | P |

FIG. 6A

| P | G | P | Q | R | P | B | P | P | G | P | Q |
|---|---|---|---|---|---|---|---|---|---|---|---|
| R | P | B | P | P | G | P | Q | R | P | B | P |
| P | G | P | Q | R | P | B | P | P | G | P | Q |
| R | P | B | P | P | G | P | Q | R | P | B | P |
| P | G | P | Q | R | P | B | P | P | G | P | Q |
| R | P | B | P | P | G | P | Q | R | P | B | P |

FIG. 6B

| P | G | P | Q | P | G | P | Q | P | G | P | Q |
|---|---|---|---|---|---|---|---|---|---|---|---|
| R | P | B | P | R | P | B | P | R | P | B | P |
| Q | P | G | P | Q | P | G | P | Q | P | G | P |
| P | R | P | B | P | R | P | B | P | R | P | B |
| P | Q | P | G | P | Q | P | G | P | Q | P | G |
| B | P | R | P | B | P | R | P | B | P | R | P |

FIG. 6C

| P | G | P | Q | P | G | P | Q | P | G | P | Q |
|---|---|---|---|---|---|---|---|---|---|---|---|
| R | P | B | P | R | P | B | P | R | P | B | P |
| P | Q | P | G | P | Q | P | G | P | Q | P | G |
| B | P | R | P | B | P | R | P | B | P | R | P |
| P | G | P | Q | P | G | P | Q | P | G | P | Q |
| R | P | B | P | R | P | B | P | R | P | B | P |

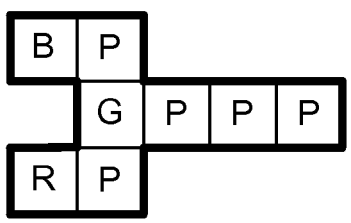
*FIG. 9A*
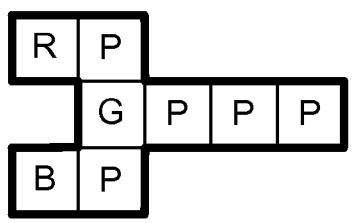
*FIG. 9B*
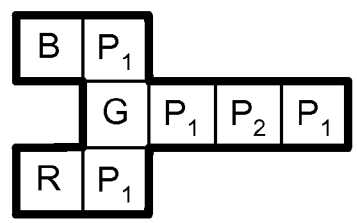
*FIG. 9C*
*FIG. 10A*
*FIG. 10B*
*FIG. 11A*
*FIG. 11B*
*FIG. 11C*
*FIG. 12*

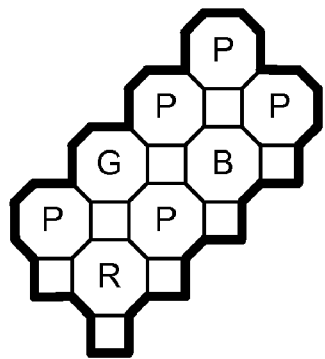
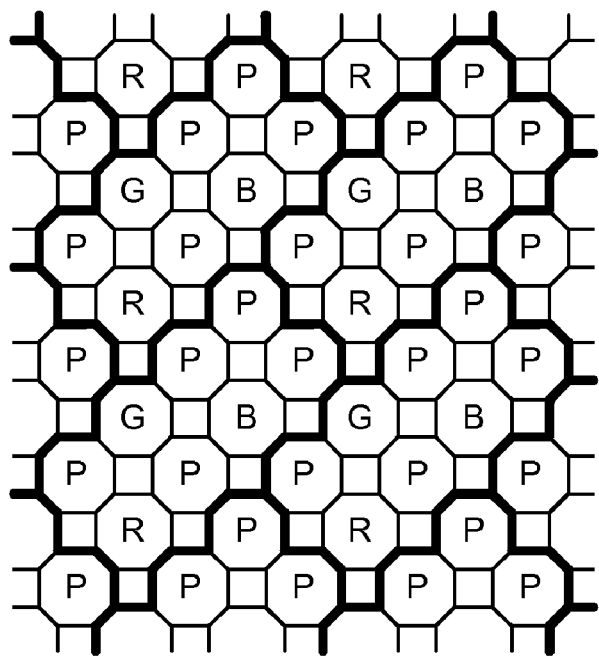
FIG. 13A  FIG. 13B
FIG. 14

LIGHT SENSITIVITY IN IMAGE SENSORS

CROSS REFERENCE TO RELATED APPLICATIONS

The present application is related to U.S. Ser. No. 11/191,538, filed Jul. 28, 2005, of John F. Hamilton Jr. and John T. Compton, entitled "PROCESSING COLOR AND PANCHROMATIC PIXELS";

U.S. Ser. No. 11/191,729, filed Jul. 28, 2005, of John T. Compton and John F. Hamilton, Jr., entitled "IMAGE SENSOR WITH IMPROVED LIGHT SENSITIVITY"; and U.S. Ser. No. 11/210,234, filed Aug. 23, 2005, of John T. Compton and John F. Hamilton, Jr., entitled "CAPTURING IMAGES UNDER VARYING LIGHTING CONDITIONS";

U.S. Ser. No. 11/341,206, filed Jan. 27, 2006 of James E. Adams, Jr., et al., entitled "INTERPOLATION OF PANCHROMATIC AND COLOR PIXELS".

FIELD OF THE INVENTION

This invention relates to a two-dimensional image sensor with improved light sensitivity

BACKGROUND OF THE INVENTION

An electronic imaging system depends on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). Typically, these images sensors include a number of light sensitive pixels, often arranged in a regular pattern of rows and columns. For capturing color images, a pattern of filters is typically fabricated on the pattern of pixels, with different filter materials being used to make individual pixels sensitive to only a portion of the visible light spectrum. The color filters necessarily reduce the amount of light reaching each pixel, and thereby reduce the light sensitivity of each pixel. A need persists for improving the light sensitivity, or photographic speed, of electronic color image sensors to permit images to be captured at lower light levels or to allow images at higher light levels to be captured with shorter exposure times.

Image sensors are either linear or two-dimensional. Generally, these sensors have two different types of applications. The two-dimensional sensors are typically suitable for image capture devices such as digital cameras, cell phones and other applications. Linear sensors are often used for scanning documents. In either case, when color filters are employed the image sensors have reduced sensitivity.

A linear image sensor, the KLI-4104 manufactured by Eastman Kodak Company, includes four linear, single pixel wide arrays of pixels, with color filters applied to three of the arrays to make each array sensitive to either red, green, or blue in its entirety, and with no color filter array applied to the fourth array; furthermore, the three color arrays have larger pixels to compensate for the reduction in light sensitivity due to the color filters, and the fourth array has smaller pixels to capture a high resolution luminance image. When an image is captured using this image sensor, the image is represented as a high resolution, high photographic sensitivity luminance image along with three lower resolution images with roughly the same photographic sensitivity and with each of the three images corresponding to either red, green, or blue light from the image; hence, each point in the electronic image includes a luminance value, a red value, a green value, and a blue value. However, since this is a linear image sensor, it requires relative mechanical motion between the image sensor and the image in order to scan the image across the four linear arrays of pixels. This limits the speed with which the image is scanned and precludes the use of this sensor in a handheld camera or in capturing a scene that includes moving objects.

There is also known in the art, an electronic imaging system described in U.S. Pat. No. 4,823,186 by Akira Muramatsu that includes two sensors, wherein each of the sensors includes a two-dimensional array of pixels but one sensor has no color filters and the other sensor includes a pattern of color filters included with the pixels, and with an optical beam splitter to provide each image sensor with the image. Since the color sensor has a pattern of color filters applied, each pixel in the color sensor provides only a single color. When an image is captured with this system, each point in the electronic image includes a luminance value and one color value, and the color image must have the missing colors at each pixel location interpolated from the nearby colors. Although this system improves the light sensitivity over a single conventional image sensor, the overall complexity, size, and cost of the system is greater due to the need for two sensors and a beam splitter. Furthermore, the beam splitter directs only half the light from the image to each sensor, limiting the improvement in photographic speed.

In addition to the linear image sensor mentioned above, there are known in the art, image sensors with two-dimensional arrays of pixels where the pixels include pixels that do not have color filters applied to them. For example, see Sato, et al. in U.S. Pat. No. 4,390,895, Yamagami, et al. in U.S. Pat. No. 5,323,233, Gindele, et al. in U.S. Pat. No. 6,476,865, and Frame in US Patent Application 2003/0210332. In each of the cited patents, the sampling arrangements for the color pixels versus the luminance or unfiltered pixels favor the luminance image over the color image or vice-versa or in some other way provide a suboptimal arrangement of color and luminance pixels.

Therefore, there persists a need for improving the light sensitivity for electronic capture devices that employ a single sensor with a two-dimensional array of pixels.

SUMMARY OF THE INVENTION

The present invention is directed to providing an image sensor having a two-dimensional array of color and panchromatic pixels that provides high sensitivity and is effective in producing full color images.

Briefly summarized, according to one aspect of the present invention, the invention provides an image sensor for capturing a color image, comprising a two-dimensional array of pixels having a plurality of minimal repeating unit wherein each repeating unit is composed of eight pixels having five panchromatic pixels and three pixels having different color responses.

Image sensors in accordance with the present invention are particularly suitable for low level lighting conditions, where such low level lighting conditions are the result of low scene lighting, short exposure time, small aperture, or other restriction on light reaching the sensor. They have a broad application and numerous types of image capture devices can effectively use these sensors. Additionally, image sensors in accordance with the present invention facilitate processing of the captured image to produce a final, fully color-rendered image.

These and other aspects, objects, features and advantages of the present invention will be more clearly understood and

BRIEF DESCRIPTION OF THE DRAWINGS

FIG. 4 (prior art) is a color filter array pattern with both panchromatic and color pixels;

FIGS. 5A-C show several minimal repeating units for color filter array patterns of the present invention;

FIGS. 6A-D show several ways to tile the minimal repeating unit of FIG. 5A;

FIGS. 7A-C show several minimal repeating units for color filter array patterns of an alternative embodiment of the present invention employing primary color filters;

FIGS. 8A-D show several ways to tile the minimal repeating unit of FIG. 7A;

FIGS. 9A-C show several minimal repeating units for color filter array patterns of an alternative embodiment of the present invention employing complementary color filters;

FIGS. 10A-B show several minimal repeating units for color filter array patterns of an alternative embodiment of the present invention employing panchromatic pixels of different photographic sensitivities;

FIGS. 11A-C provides alternative minimal repeating units for the color filter arrays of FIGS. 7A-C that results in tiling similar to FIG. 8D;

FIG. 12 shows the tiling arrangement for the minimal repeating unit of FIG. 11A;

FIGS. 13A-B shows a minimal repeating unit for a color filter array of the present invention in which the pixels are arranged in a octagonal pattern, and includes a tiling arrangement;

FIG. 14 shows the spatial distribution of color samples from the tiling arrangement of FIG. 8D;

FIGS. 17A-E shows the production of lower resolution Bayer images from an image sensor of the present invention;

FIG. 19 shows an arrangement of color and panchromatic pixels of the present invention with indices to support the explanation of an interpolation approach.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
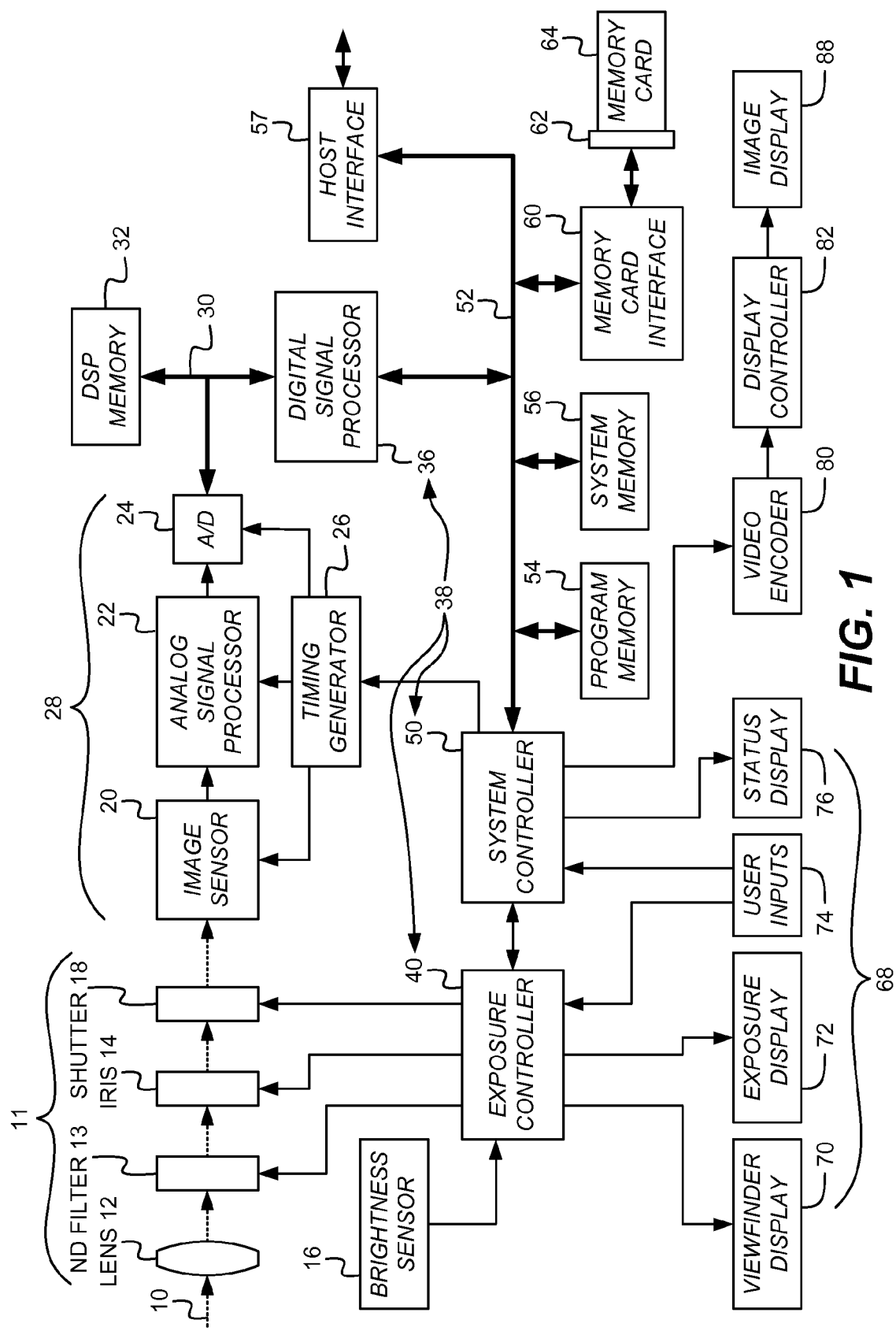
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices. In the disclosed camera, light 10 from the subject scene is input to an imaging stage 11, where the light is focused by lens 12 to form an image on solid state image sensor 20. Image sensor 20 converts the incident light to an electrical signal for each picture element (pixel). The image sensor 20 of the preferred embodiment is a charge coupled device (CCD) type or an active pixel sensor (APS) type (APS devices are often referred to as CMOS sensors because of the ability to fabricate them in a Complementary Metal Oxide Semiconductor Process). Other types of image sensors having two-dimensional array of pixels are used provided that they employ the patterns of the present invention. The present invention also makes use of an image sensor 20 having a two-dimensional array of color and panchromatic pixels as will become clear later in this specification after FIG. 1 is described. Examples of the patterns of color and panchromatic pixels of the present invention that are used with the image sensor 20 are seen in FIGS. 4A-D, FIG. 8A, FIG. 8E, FIGS. 9A-C, FIG. 10A, FIGS. 10C-F, FIGS. 11A-B, FIG. 12, and FIG. 15, although other patterns are used within the spirit of the present invention.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

This description of a particular camera configuration will be familiar to one skilled in the art, and it will be obvious that many variations and additional features are present. For example, an autofocus system is added, or the lenses are detachable and interchangeable. It will be understood that the present invention is applied to any type of digital camera, where similar functionality is provided by alternative components. For example, the digital camera is a relatively simple point and shoot digital camera, where the shutter 18 is a relatively simple movable blade shutter, or the like, instead of the more complicated focal plane arrangement. The present invention can also be practiced on imaging components included in non-camera devices such as mobile phones and automotive vehicles.

The analog signal from image sensor 20 is processed by analog signal processor 22 and applied to analog to digital (A/D) converter 24. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The components of image sensor stage 28 is separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software necessary for practicing image processing shown in FIG. 18. Memory 32 includes of any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high speed connection to a personal computer (PC) or other host computer for transfer of image data for display, storage, manipulation or printing. This interface is an IEEE1394 or USB2.0 serial interface or any other suitable digital interface. Memory card 64 is typically a CompactFlash (CF) card inserted into socket 62 and connected to the system controller 50 via memory card interface 60. Other types of storage that are used include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

A user control and interface status 68, includes all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touchscreens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating.

With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and is selected to reduce the cost, add features or improve the performance of the camera. The following description will disclose in detail the operation of this camera for capturing images according to the present invention. Although this description is with reference to a digital camera, it will be understood that the present invention applies for use with any type of image capture device having an image sensor with color and panchromatic pixels.

The image sensor 20 shown in FIG. 1 typically includes a two-dimensional array of light sensitive pixels fabricated on a silicon substrate that provide a way of converting incoming light at each pixel into an electrical signal that is measured. As the sensor is exposed to light, free electrons are generated and captured within the electronic structure at each pixel. Capturing these free electrons for some period of time and then measuring the number of electrons captured or measuring the rate at which free electrons are generated measures the light level at each pixel. In the former case, accumulated charge is shifted out of the array of pixels to a charge to voltage measurement circuit as in a charge coupled device (CCD), or the area close to each pixel contains elements of a charge to voltage measurement circuit as in an active pixel sensor (APS or CMOS sensor).

Whenever general reference is made to an image sensor in the following description, it is understood to be representative of the image sensor 20 from FIG. 1. It is further understood that all examples and their equivalents of image sensor architectures and pixel patterns of the present invention disclosed in this specification is used for image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figure 2:
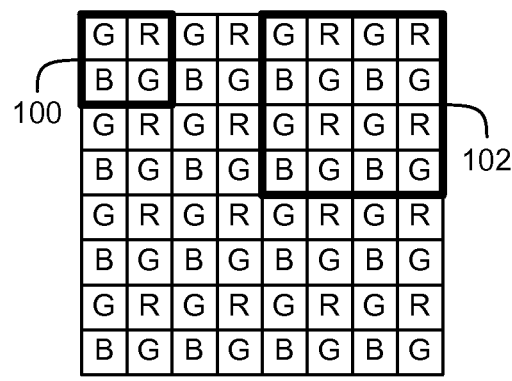
FIG. 2 (prior art) is a conventional Bayer color filter array pattern showing a minimal repeating unit and a non-minimal repeating unit.

In order to produce a color image, the array of pixels in an image sensor typically has a pattern of color filters placed over them. FIG. 2 shows a pattern of red, green, and blue color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum. The term color pixel will refer to a pixel having a color photoresponse.

The set of color photoresponses selected for use in a sensor usually has three colors, as shown in the Bayer CFA, but it can also include four or more. As used herein, a panchromatic photoresponse refers to a photoresponse having a wider spectral sensitivity than those spectral sensitivities represented in the selected set of color photoresponses. A panchromatic photosensitivity can have high sensitivity across the entire visible spectrum. The term panchromatic pixel will refer to a pixel having a panchromatic photoresponse. Although the panchromatic pixels generally have a wider spectral sensitivity than the set of color photoresponses, each panchromatic pixel can have an associated filter. Such filter is either a neutral density filter or a color filter.

When a pattern of color and panchromatic pixels is on the face of an image sensor, each such pattern has a repeating unit that is a contiguous subarray of pixels that acts as a basic building block. By juxtaposing multiple copies of the repeating unit, the entire sensor pattern is produced. The juxtaposition of the multiple copies of repeating units is done in diagonal directions as well as in the horizontal and vertical directions.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2. Multiple copies of this minimal repeating unit are tiled to cover the entire array of pixels in an image sensor. The minimal repeating unit is shown with a green pixel in the upper right corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and block 100 has fewer pixels than block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. No. 5,506,619, U.S. Pat. No. 5,629,734, and U.S. Pat. No. 5,652,621.

Figure 3:
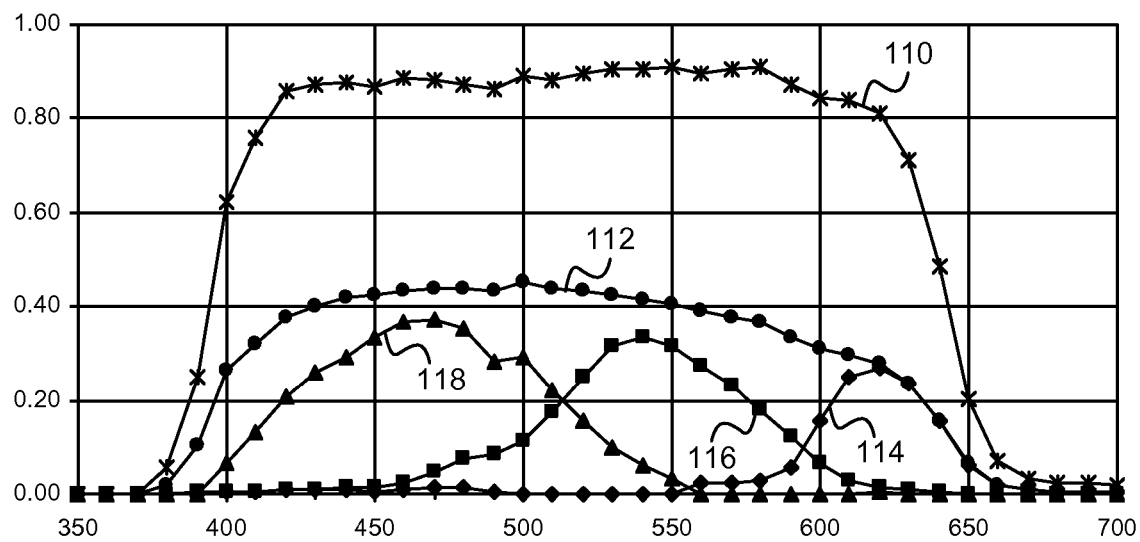
FIG. 3 provides representative spectral quantum efficiency curves for red, green, and blue pixels, as well as a wider spectrum panchromatic quantum efficiency, all multiplied by the transmission characteristics of an infrared cut filter.

FIG. 3 shows the relative spectral sensitivities of the pixels with red, green, and blue color filters in a typical camera application. The X-axis in FIG. 3 represents light wavelength in nanometers, and the Y-axis represents efficiency. In FIG. 3, curve 110 represents the spectral transmission characteristic of a typical filter used to block infrared and ultraviolet light from reaching the image sensor. Such a filter is needed because the color filters used for image sensors typically do not block infrared light, hence the pixels are unable to distinguish between infrared light and light that is within the passbands of their associated color filters. The infrared blocking characteristic shown by curve 110 prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by curve 112; this is an example of a panchromatic photoresponse. By comparing the color photoresponse curves 114, 116, and 118 to the panchromatic photoresponse curve 112, it is clear that the panchromatic photoresponse is three to four times more sensitive to wide spectrum light than any of the color photoresponses. Although another sensor of a different type may have different photoresponses than shown by FIG. 3, it is clear that the broader panchromatic response will always be more sensitive to wide spectrum light than any of the color photoresponses.

The greater panchromatic sensitivity shown in FIG. 3 permits improving the overall sensitivity of an image sensor by intermixing pixels that include color filters with pixels that do not include color filters. However, the color filter pixels will be significantly less sensitive than the panchromatic pixels. In this situation, if the panchromatic pixels are properly exposed to light such that the range of light intensities from a scene cover the full measurement range of the panchromatic pixels, then the color pixels will be significantly underexposed. Hence, it is advantageous to adjust the sensitivity of the color filter pixels so that they have roughly the same sensitivity as the panchromatic pixels. The sensitivity of the color pixels is increased, for example, by increasing the size of the color pixels relative to the panchromatic pixels, with an associated reduction in spatial pixels.

In an image capture device that includes panchromatic pixels as well as color pixels, the arrangement of panchromatic and color pixels within the pixel array affects the spatial sampling characteristics of the image capture device. To the extent that panchromatic pixels take the place of color pixels, the frequency of color sampling is reduced. For example, if one of the green pixels in minimal repeating unit 100 in FIG. 2 is replaced with a panchromatic pixel, as in Gindele, et al. in U.S. Pat. No. 6,476,865, then the green sampling frequency is reduced because there are half as many green pixels as in the original pattern shown in FIG. 2. In this particular case, the sampling frequencies of the panchromatic pixels and each of the color pixels are the same.

Since the panchromatic pixels are generally more sensitive than the color pixels, it is desirable to have higher sampling frequency for the panchromatic pixels than any one of the color pixels, thereby to provide a robust, higher sensitivity panchromatic representation of the image to provide the basis for subsequent image processing and interpolation of missing colors at each pixel. For example, Yamagami, et al. in U.S. Pat. No. 5,323,233 shows a pattern with 50% panchromatic pixels, 25% green pixels, and 12.5% each of red and blue pixels. A minimal repeating unit of this pattern is shown in FIG. 4. Having twice as many green pixels as either of the color pixels is consistent with the widely used Bayer pattern, but it does not necessarily provide an advantage when combined with a robust panchromatic sampling arrangement as shown in Yamagami. Reducing the green sampling arrangement to be comparable to the other colors will not have a significant adverse affect on the fully processed image. Replacing one of the green pixels in FIG. 4 with a different color pixel provides additional spectral information without affecting the panchromatic sampling arrangement and without having a significant affect on the color sampling.

FIG. 5A shows a minimal repeating unit of the present invention with four panchromatic pixels uniformly disposed throughout the minimal repeating unit, and one red pixel (R), one green pixel (G), one blue pixel (B), and one color pixel having a fourth distinct spectral sensitivity (Q). The minimal repeating unit of FIG. 5A takes the additional green pixel of Yamagami (FIG. 4) and replaces it with a pixel having a spectral sensitivity distinct from the other three colors. This pattern has 50% panchromatic pixels and 12.5% each of pixels that have one of four distinct spectral sensitivities. The Q pixel is a different visible range than provided by R, G, or B; alternatively, the Q pixel encompasses non-visible range. For example, the Q pixel can be sensitive to infrared light.

FIG. 5B shows another minimal repeating unit of the present invention. FIG. 5B is similar to FIG. 5A except the green and blue pixels have been exchanged. The color sampling frequency for each color remains the same, but the phase relationship between the four color sampling arrangements is different between FIG. 5A and FIG. 5B. FIG. 5C shows yet another minimal repeating unit of the present invention. FIG. 5C is similar to FIG. 5A except red, green, and blue pixels have been replaced with cyan, yellow, and magenta pixels, respectively, demonstrating that this embodiment of the present invention can be used with any set of four distinct spectral sensitivities.

The minimal repeating unit of FIG. 5A is tiled to provide a larger array of pixels with no missing pixels in several ways. FIG. 6A shows a tiling arrangement in which the minimal repeating unit of FIG. 5A is tiled evenly in rows and columns. FIG. 6B shows a tiling arrangement for FIG. 5A in which every other column is shifted down (or, equivalently, up) by one pixel; in other words, the minimal repeating unit of FIG. 5A is tiled evenly in columns, with each column shifted vertically by one-half of the minimal repeating unit height with respect to adjacent columns. FIG. 6C shows a tiling arrangement in which every row is shifted right by one pixel with respect to the row above; in other words, the minimal repeating unit of FIG. 5A is tiled evenly in rows, with each row shifted right one-quarter of the minimal repeating unit width with respect to the adjacent row above. FIG. 6D shows a tiling arrangement in which every other row is shifted right (or, equivalently, left) by two pixels, or one-half of the width of the minimal repeating unit; in other words, the minimal repeating unit of FIG. 5A is tiled evenly in rows, with each row shifted right one-half of the minimal repeating unit width with respect to the adjacent rows.

The tiling arrangements for FIG. 5A shown in FIGS. 6A through 6C provide pixel arrays with sampling frequencies for the individual colors that are different between the horizontal and vertical directions. The tiling arrangement of FIG. 6D provides a pixel array with sampling frequencies for the individual colors that are identical between the horizontal and vertical directions and are identical between the upper-left to lower-right diagonal (slash) and the upper-right to lower left diagonal (backslash) directions; furthermore, the sampling frequencies are identical between colors, and the highest sampling frequency for the colors is associated with the horizontal and vertical directions. Arranging the highest sampling frequency to be associated with the horizontal and vertical directions allows vertical and horizontal edges to be sampled with the lowest chance for aliasing. Hence, based on the arguments above, FIG. 6D provides a preferred tiling arrangement for the minimal repeating unit of FIG. 5A.

Pixels of three different spectral sensitivities are generally sufficient to provide color information for a captured color image. The well-known Bayer pattern, for example, is commonly implemented with pixels having red, green, and blue sensitivities. In a panchromatic/color image capture device there is an advantage to providing a greater proportion of panchromatic pixels than any one color pixel in order to capture a robust panchromatic image. Assuming that pixels with three different spectral sensitivities are sufficient for color information and motivated by an interest in improving the panchromatic sampling, the pixel with a fourth spectral sensitivity Q in FIG. 5A is made a panchromatic pixel. If Q is panchromatic, then the minimal repeating unit has 62.5% panchromatic pixels and 12.5% each of red, green, and blue pixels. This provides an improved balance between panchromatic sampling to provide a robust panchromatic representation of the image and color sampling to identify colors within the image.

Figures 7A, 7B, 7C, 8A, 8B, 8C, 8D:
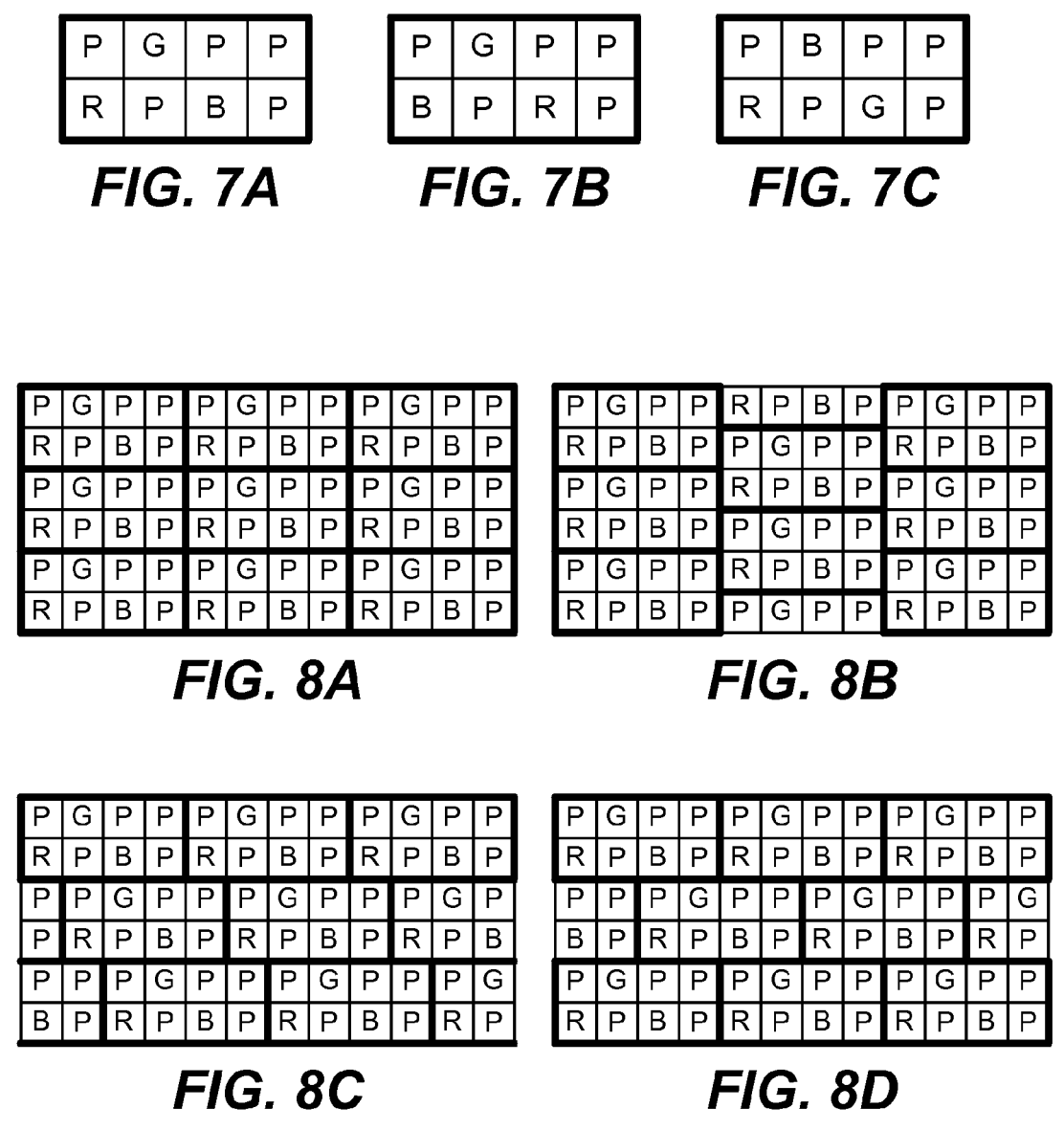

FIG. 7A shows a minimal repeating unit of an alternative embodiment of the present invention having eight pixels, of which five are panchromatic pixels and the remaining three pixels are three different colors. This minimal repeating unit has the proportion of panchromatic pixels and color pixels discussed in the last paragraph. In FIG. 7A, the three color pixels are red, green, and blue. Note that several arrangements of three color and five panchromatic pixels are possible. For example, FIG. 7B is similar to FIG. 7A except the red and blue pixels are switched, thereby forming a new and distinct minimal repeating unit. FIG. 7C is similar to FIG. 7A, except the green and blue pixels are switched.

The minimal repeating unit of FIG. 7A is tiled to provide a larger array of pixels with no missing pixels in several ways. FIGS. 8A-8D show tiling arrangements for the minimal repeating unit of FIG. 7A that correspond to the tiling arrangements shown in FIGS. 6A-6D. Based on the discussion regarding FIGS. 6A-6D above, FIG. 8D provides the optimum tiling arrangement for the minimal repeating unit of FIG. 7A.

Note that although the color pixels are red, green, and blue in the foregoing discussion, an alternative set of colors such as cyan, magenta, and yellow can be used. FIG. 9A is similar to FIG. 7A except red, green, and blue pixels have been replaced with cyan, yellow, and magenta pixels, respectively, demonstrating that this embodiment of the present invention can be used with any set of three distinct spectral sensitivities for the color pixels. FIGS. 9B and 9C show additional arrangements for the cyan, magenta, and yellow color pixels.

The panchromatic pixels in patterns of the present invention do not need to be identical in sensitivity. For example, FIG. 10A shows a minimal repeating unit similar to FIG. 5A in which the Q pixel is replaced with a panchromatic pixel of a different photographic speed than the other panchromatic pixels. Panchromatic pixels with different photographic sensitivities are used to capture a broader range of light levels. FIG. 10B shows another minimal repeating unit with an alternative arrangement of panchromatic pixels with two different photographic speeds, with one row of the minimal repeating unit having one speed and the other row having a different speed.

Although the minimal repeating units used to describe the present invention to this point are all two rows of four pixels per row arranged in a rectangle, there are alternative equivalent minimal repeating units. For example, FIG. 11A shows a minimal repeating unit of the present invention that is equivalent to the minimal repeating unit of FIG. 7A as tiled in FIG. 8D. In addition, FIG. 11B is equivalent to FIG. 7B if FIG. 7B is tiled similar to FIG. 8D, and FIG. 11C is equivalent to FIG. 10A if FIG. 10A is tiled similar to FIG. 8D.

Note that rotating any of the patterns of FIG. 5A, FIG. 7A, FIG. 10A, FIG. 11A, or any of the other previously described embodiments of the present invention is completely within the scope of the present invention. For example, FIG. 13A shows a minimal repeating unit of an arrangement of octagonal pixels that is equivalent to rotating the minimal repeating unit of FIG. 7A forty-five degrees counter-clockwise. FIG. 13B shows the minimal repeating unit of FIG. 13A tiled to form a pattern that is equivalent to a forty-five degree counter-clockwise rotation of FIG. 8D.

Although the sampling frequencies for each color of the four colors of FIG. 6D or the three colors of FIG. 8D are identical, the phase relationships between the colors are not identical. For example, the pixels of each color in FIG. 8D (i.e., red, green, and blue) provide identical sampling patterns for the three colors. This is clearly seen by examining each individual color in FIG. 14, which is the same pattern as FIG. 8D with only the color pixels identified. However, while each blue pixel is equidistant from four neighboring red pixels, forming a checkerboard of red and blue pixels, the green pixels are located between red pixels in 45 degree diagonal lines, and between blue pixels in −45 degree diagonal lines. Obviously the phase relationship between green and the other two colors is different than between red and blue, even though red, green, and blue individually have identical sampling arrangements. This suggests opportunities for further optimization of a panchromatic/three-color imaging device where the color sampling arrangement is identical for each of the three colors and the phase relationships between the pairs of colors is consistent.

Figure 15A:
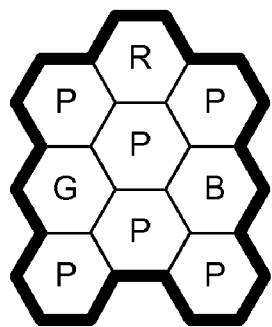
FIGS. 15A-B shows a minimal repeating unit for a color filter array of the present invention in which the pixels are arranged in a hexagonal fashion.
Figure 15B:
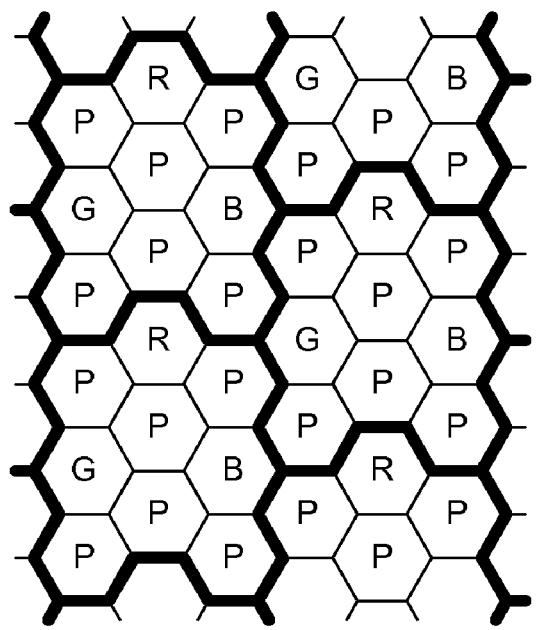

FIG. 15A shows a minimal repeating unit of yet another embodiment of the present invention. The minimal repeating unit of FIG. 15A includes nine pixels, of which six are panchromatic pixels and the remaining three pixels are three different colors. This minimal repeating unit represents a pattern that is ⅔ panchromatic pixels, ⅑ red pixels, ⅑ green pixels, and ⅑ blue pixels. As has been discussed with previous minimal repeating units, the three color pixels in FIG. 15A are red, green, and blue, but they could be cyan, magenta, and yellow, or some other set of three colors. Furthermore, the panchromatic pixels in FIG. 15A have equal photographic sensitivity, but they could have two or more different sensitivities. FIG. 15B shows a tiling arrangement in which the minimal repeating unit of FIG. 15A is tiled evenly in columns, with each column shifted up or down one-half of the minimal repeating unit height with respect to the adjacent columns.

Figure 16:
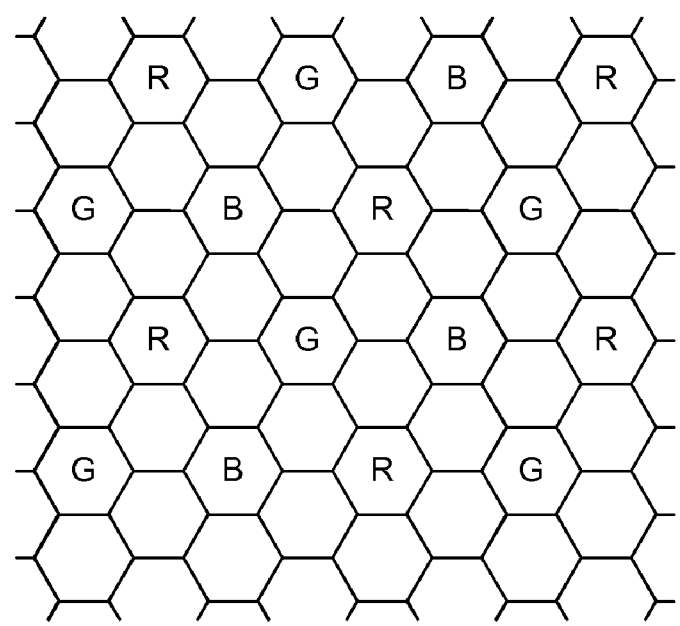
FIG. 16 shows the spatial distribution of color samples from the tiling arrangement of FIG. 15B.

FIG. 16 shows the pattern of FIG. 15B with only the color pixels identified. It is clear from FIG. 16 that the sampling arrangements for each of the three colors is identical, and the phase relationships between each of the colors is consistent. Where certain of the color pixels in FIG. 14 are closer to certain other colors, all of the color pixels in FIG. 15B are located equidistant from each other.

For some purposes it is advantageous to produce a lower resolution image from the sensor, for example to provide a higher frame rate for video capture or to provide an active preview image on a display screen. In FIG. 1, DSP 36 provides a processed image from the raw image provided by the sensor and imaging subsystem. In order to provide a series of processed images at video frame rates, DSP 36 in many cases provides a hardwired image processing path (as opposed to a programmable image processing path). Such hardwired image processing paths often require sensor data to conform to the Bayer filter pattern:

| G | R |
|---|---|
| B | G |

Therefore, it is advantageous to provide the ability to read conveniently a reduced resolution, Bayer image from a sensor of the present invention.

Figures 17A, 17B, 17C:
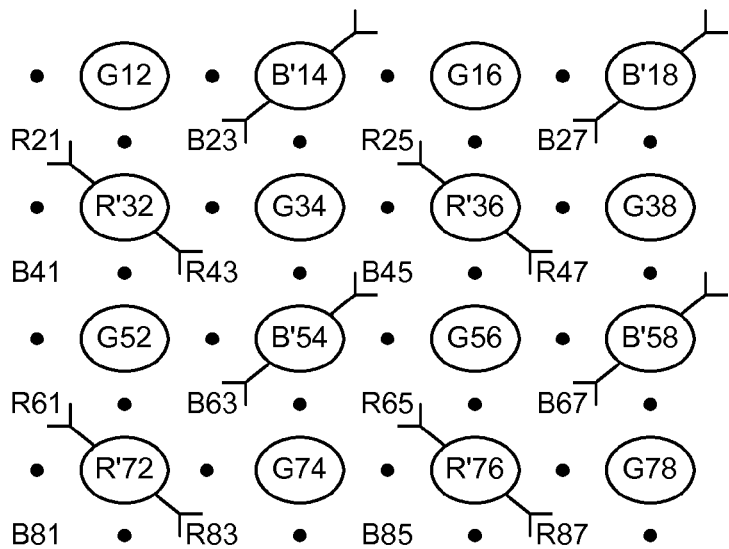

Referring to FIG. 17A, there is shown an arrangement of color and panchromatic pixels of the present invention. FIG. 17A is similar to FIG. 8D, with the addition of indices to each pixel to help demonstrate the production of a reduced resolution Bayer image from an image sensor of the present invention. FIG. 17A, the minimal repeating unit 120 is shown to be the same as that shown in FIG. 7A. Let all the green pixels in FIG. 17A (e.g., G12, G16, G34, G38, etc.) be used without modification. These green pixels, shown circled in FIG. 17B, form the checkerboard of green pixels that are present in the Bayer pattern. For the red and blue pixels in the Bayer pattern, combine red and blue pixels in pairs to produce red and blue pixel averages. For example, R21 and R43 are combined to produce circled red pixel average R'32 in FIG. 17B between green pixels G12 and G52. Similar diagonal combinations of red pixels provide appropriately positioned red pixel averages in the reduced resolution Bayer image. Similarly, B45 and B63 are combined to produce circled blue pixel average B'54 in FIG. 17B between green pixels G34 and G74. Similar diagonal combinations of blue pixels provide appropriately positioned blue pixel averages in the reduced resolution Bayer image. FIG. 17C shows the resulting image: a Bayer image with ½ the horizontal resolution and ½ the vertical resolution of the original image.

Figures 17D, 17E:
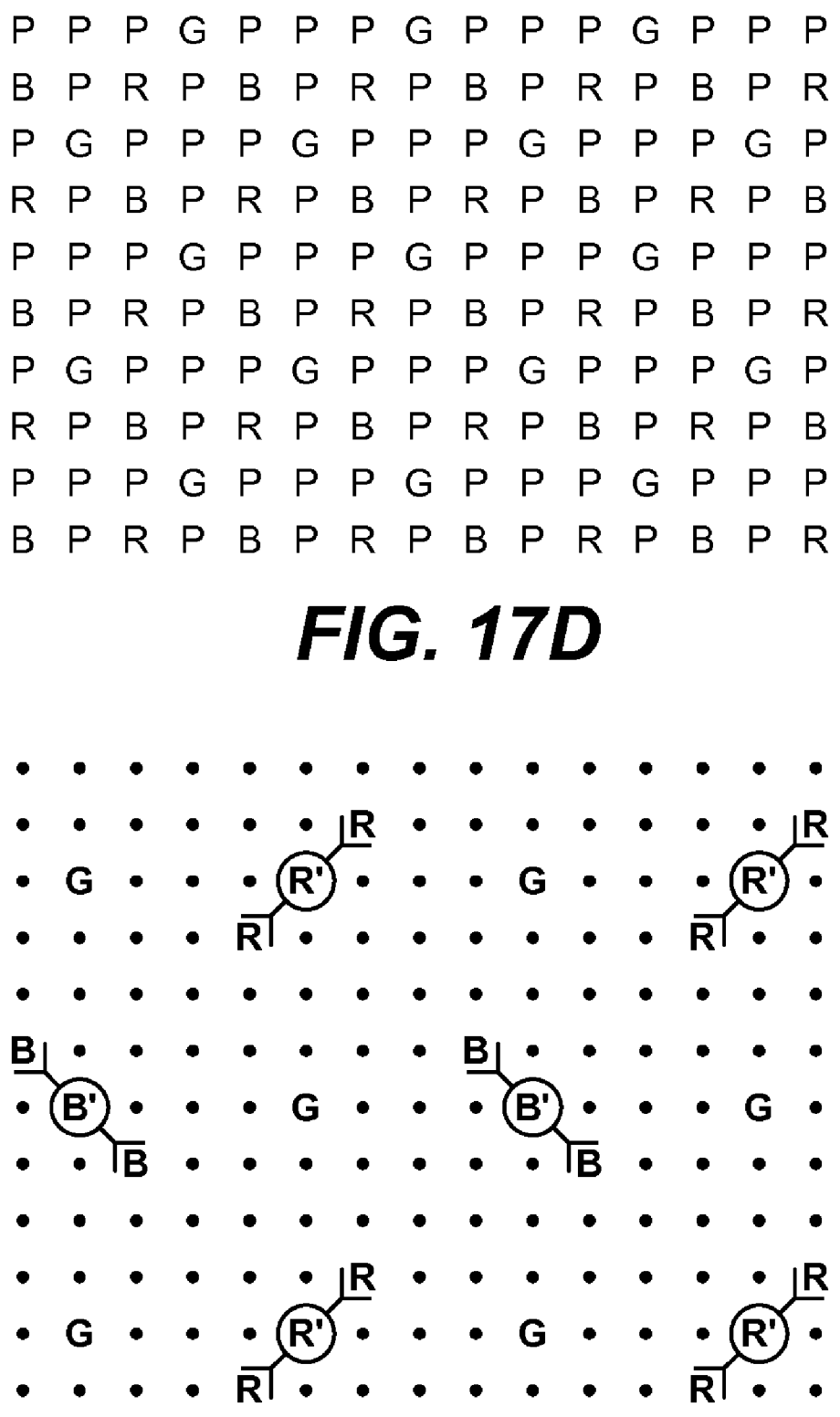

FIGS. 17A-17C demonstrate the production of a Bayer image that has ¼ the number of pixels of the original image. FIGS. 17D and 17E demonstrate using similar techniques to produce a Bayer image that has 1/16 the number of pixels of the original image. Combining pixels as shown in FIG. 17B and FIG. 17E is done, for example, by combining charge in the pixels, by averaging sampled voltages, or by combining digital representations of the pixel signals.

Figure 18:
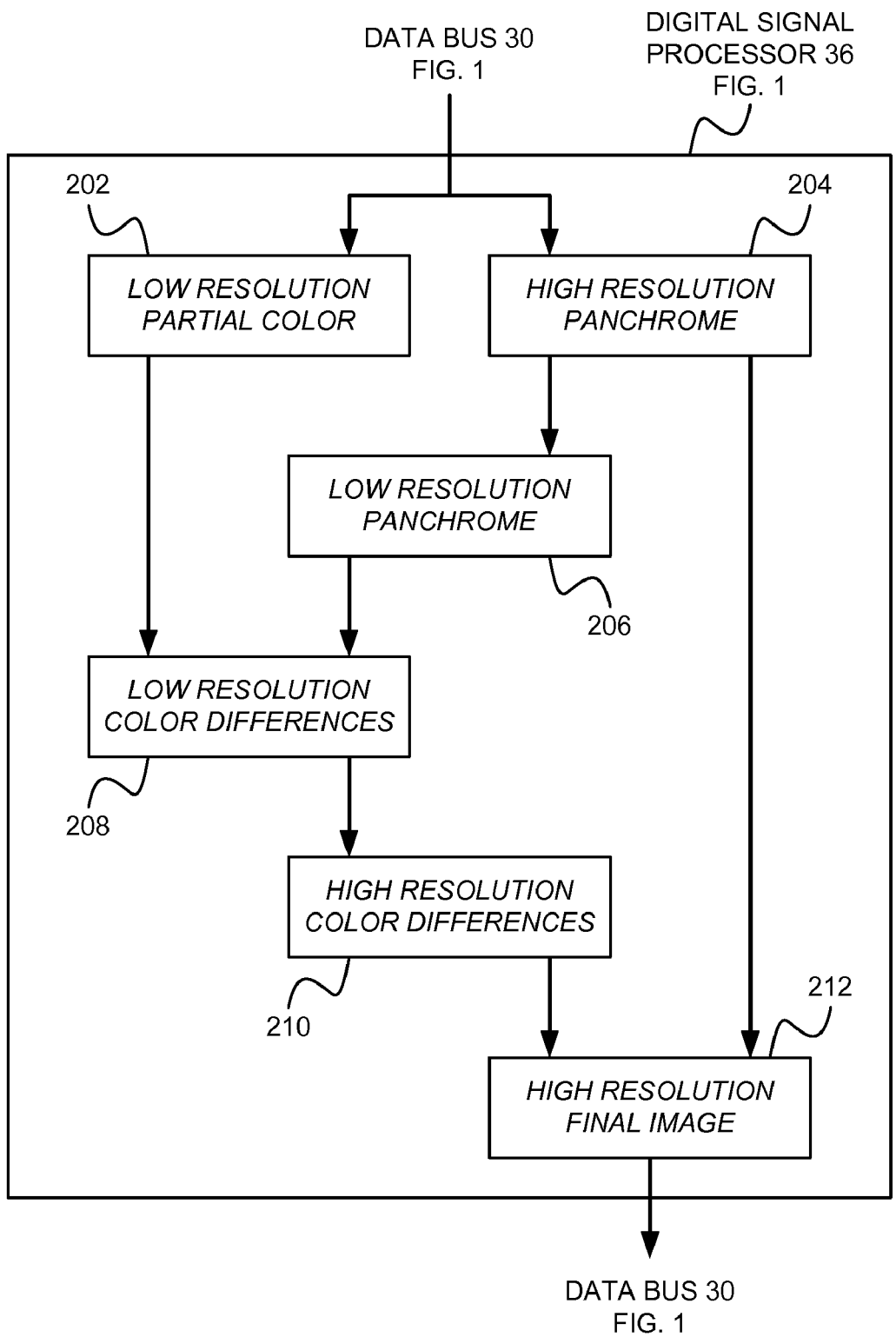
FIG. 18 is a process diagram of the present invention showing the method of processing the color and panchromatic pixel data from a sensor of the present invention.

Turning now to FIG. 18, the digital signal processor block 36 (FIG. 1) is shown receiving captured raw image data produced by an image sensor of the present invention and carried by the data bus 30 (FIG. 1). The raw image data is passed to both the Low-resolution Partial Color block 202 and the High-resolution Panchrome block 204. An example of a minimal repeating unit for an image sensor of the present invention has already been shown in FIG. 7A.

In the Low-resolution Partial Color block 202 (FIG. 18), a partial color image is produced from the captured raw image data, a partial color image being a color image wherein each pixel has at least one color value and each pixel is also missing at least one color value. Since there are proportionately fewer of color pixels with a given spectral response compared to the panchromatic pixels, the partial color image is consequently lower in spatial resolution compared to the image captured by the panchromatic pixels.

The Low-resolution Partial Color block 202 processes each pixel of the partial color image in a similar manner resulting in an array of color values, one for each low resolution pixel. Although not shown here, it is often advantageous to noise clean the low-resolution partial color image in this step.

Referring to FIG. 19, a filter pattern is shown that is equivalent to the pattern shown in FIG. 17A. The minimal repeating unit 220 (FIG. 19) is seen to match the minimal repeating unit 120 (FIG. 17A). Referring again to FIG. 19, the interstitial panchromatic values at locations (a), (b), (c), and (d) can be computed according to the following equations:

$$a = (-P30 + 9*P21 + 9*P12 - P03)/16$$

$$b = (-P34 + 9*P23 + 9*P12 - P01)/16$$

$$c = (-P10 + 9*P21 + 9*P32 - P43)/16$$

$$d = (-P14 + 9*P23 + 9*P32 - P41)/16$$

Thus, the pixel containing green value G22 has eight neighboring pan values in the shape of a diamond, namely, P21, a, P12, b, P23, d, P32, c. Classifier values can now be computed at pixel G22 using the absolute value of the four center-difference gradients in the horizontal, vertical, slash, and backslash directions:

$$clashorz = |P23 - P21|$$

$$clasvert = |P12 - P32|$$

$$classlash = |b - c|$$

$$clasback = |a - d|$$

The corresponding predictor values for these directions are:

$$predhorz = (P23 + P21)/2$$

$$predvert = (P12 + P32)/2$$

$$predslash = (b + c)/2$$

$$predback = (a + d)/2$$

After selecting the direction having the smallest classifier value, the pan predicted value corresponding to the selected direction produces the interpolated pan value, P22.

Once pan values have been interpolated for the green pixels, it remains to do the same for the red and blue pixels. Again referring to the CFA pattern shown in FIG. 19, it can be seen that the same pan interpolation process used for green pixels applies equally well to red and blue pixels. For example, the pan pixels P23, P32, P34, and P43 immediately surround blue pixel B33 just as pan pixels P12, P21, P23, and P32 immediately surround green pixel G22. Neighboring interstitial pan values for pixel B33 can be computed using equations similar to those given above for green pixel G22.

After pan values have been interpolated at all color pixel positions, there is a pan value, either measured or interpolated, for each pixel position on the sensor. These pan values make up the high resolution panchrome image 204, as shown in FIG. 19. The low resolution panchrome image 206 is produced by selecting only those pixels having interpolated panchromatic values. The low resolution panchrome image 206 is now combined with the low resolution partial color image 202 to produce low resolution color differences 208. The next processing step is to produce the high resolution color differences 210 which begins by finding the green minus pan, G−P, value for the center pan pixel in each pan diamond. Once a G−P color difference value is produced, it is then added to the center pan value to produce a green value in the high resolution final image 212.

Referring to FIG. 19, such a center pixel would be P24 since it is in the center of the diamond shaped collection of pan pixels defined by: P14, P23, P24, P25, P34. The four nearest green values are G04, G22, G26, and G44. Each of these four green pixels also has an interpolated pan value, so the G−P color differences can be computed at each location. Horizontal and vertical classifier and predictor values can be computed according to the following equations:

$$clashorz = |(G22 - P22) - (G26 - P26)| + |P22 - 2*P24 + P26|$$

$$clasvert = |(G04 - P04) - (G44 - P44)| + |P04 - 2*P24 + P44|$$

$$predhorz = [(G22 - P22) + (G26 - P26)]/2$$

$$predvert = [(G04 - P04) + (G44 - P44)]/2$$

The smaller classifier indicates which predictor value to use. The indicated color difference is then added to the pan value at the center pixel, P24, to produce the interpolated green value, G24.

Once the green values have been computed for the center pixel of each pan diamond, there is a green value for every pixel having two even subscripts. The next step is to compute green values at every pixel having two odd subscripts. For example, considering blue pixel B33, slash and backslash classifier and predictor values can computed according to the following equations:

$$classlash=|(G42-P42)-(G24-P24)|+|P42-2*P33+P24|$$

$$clasback=|(G22-P22)-(G44-P44)|+|P22-2*P33+P44|$$

$$predslash=[(G42-P42)+(G24-P24)]/2$$

$$predback=[(G22-P22)+(G44-P44)]/2$$

The smaller classifier indicates which predictor value to use. The indicated color difference is then added to the pan value at pixel B33 to produce the interpolated green value, G33. The same approach is taken for red pixels. Once all these green values have been computed, there are green values for all pixel locations having subscripts that are either both odd or both even.

To complete the green interpolation, consider a pixel have one odd and one even subscript such as pixel P32. Horizontal and vertical classifier and predictor values can be computed according to the following equations:

$$clashorz=|(G31-P31)-(G33-P33)|+|P31-2*P32+P33|$$

$$clasvert=|(G22-P22)-(G42-P42)|+|P22-2*P32+P42|$$

$$predhorz=[(G31-P31)+(G33-P33)]/2$$

$$predvert=[(G22-P22)+(G42-P42)]/2$$

The smaller classifier indicates which predictor value to use. The indicated color difference is then added to the pan value at the center pixel, P32, to produce the interpolated green value, G32.

All pixel locations now have pan values and green values. It remains to interpolate any missing red and blue values. Because there are the same numbers of red, green, and blue pixels, and because their geometric layout patterns are the same, the set of equations for interpolating green can be modified and applied to red pixels as well as blue pixels. In general, the method of computing a red value involves finding a R–G color difference value that is then added to an existing green value to produce a red value. Pan values are still used in determining the classifier values.

For example, consider computing a red value at blue pixel B33. Horizontal and vertical classifier and predictor values can computed using R–G color differences according to the following equations:

$$clashorz=|(R31-G31)-(R35-G35)|+|P31-2*P33+P35|$$

$$clasvert=|(R13-G13)-(R15-G15)|+|P13-2*P33+P15|$$

$$predhorz=[(R31-G31)+(R35-G35)]/2$$

$$predvert=[(R13-G13)+(R35-G35)]/2$$

The smaller classifier indicates which predictor value to use. The indicated color difference is then added to the green value at the blue pixel, B24, to produce the interpolated red value, R24. A similar set of equations using B–G color differences can be used to compute blue values at red pixel locations.

Once red values have been computed at all blue pixel locations and blue values have been computed at red pixel locations, there are red and blue values for every pixel location having two odd subscripts.

The next step is to compute red and blue values at pixels having two even subscripts. For example, consider computing a red value at the green pixel location G44. Slash and backslash classifier and predictor values can be computed according to the following equations:

$$classlash=|(R53-G53)-(R35-G35)|+|P53-2*P44+P35|$$

$$clasback=|(R33-G33)-(R55-G55)|+|P33-2*P44+P55|$$

$$predslash=[(R53-G53)+(R35-G35)]/2$$

$$predback=[(R33-G33)+(R55-G55)]/2$$

The smaller classifier indicates which predictor value to use. The indicated color difference is then added to the green value at pixel G44 to produce the interpolated red value, R33. The same approach is taken for blue pixels. Once all the red and blue values have been computed, there are red and blue values for all pixel locations having subscripts that are either both odd or both even.

To complete the color interpolation process, consider a pixel have one odd and one even subscript such as pixel P32, and compute a red value. Horizontal and vertical classifier and predictor values can be computed according to the following equations:

$$clashorz=|(R31-G31)-(R33-G33)|+|P31-2*P32+P33|$$

$$clasvert=|(R22-G22)-(R42-G42)|+|P22-2*P32+P42|$$

$$predhorz=[(R31-G31)+(R33-G33)]/2$$

$$predvert=[(R22-G22)+(R42-G42)]/2$$

The smaller classifier indicates which predictor value to use. The indicated color difference is then added to the green value at the pan pixel location P32 to produce the interpolated red value, R32. The same approach, using B-G color differences, is taken to compute the blue value B32. At this point the color interpolation is done because each pixel has all three color values: red, green, and blue. These pixels make up the high resolution final image 212.

The invention has been described in detail with particular reference to certain preferred embodiments thereof, but it will be understood that variations and modifications are effected within the spirit and scope of the invention.

| PARTS LIST |
| --- |
| 10 light from subject scene |
| 11 imaging stage |
| 12 lens |
| 13 neutral density filter |
| 14 iris |
| 16 brightness sensor |
| 18 shutter |
| 20 image sensor |
| 22 analog signal processor |
| 24 analog to digital (A/D) converter |
| 26 timing generator |
| 28 image sensor stage |

PARTS LIST

- 30 digital signal processor (DSP) bus
- 32 digital signal processor (DSP) memory
- 36 digital signal processor (DSP)
- 38 processing stage
- 40 exposure controller
- 50 system controller
- 52 system controller bus
- 54 program memory
- 56 system memory
- 57 host interface
- 60 memory card interface
- 62 memory card socket
- 64 memory card
- 68 user control and status interface
- 70 viewfinder display
- 72 exposure display
- 74 user inputs
- 76 status display
- 80 video encoder
- 82 display controller
- 88 image display
- 100 minimal repeating unit for Bayer pattern
- 102 repeating unit for Bayer pattern that is not minimal
- 110 spectral transmission curve of infrared blocking filter
- 112 unfiltered spectral photoresponse curve of sensor
- 114 red photoresponse curve of sensor
- 116 green photoresponse curve of sensor
- 118 blue photoresponse curve of sensor
- 120 minimal repeating unit
- 202 low-resolution partial color block
- 204 high-resolution panchromatic block
- 206 low-resolution panchromatic block
- 208 low-resolution color differences block
- 210 high-resolution color differences block
- 212 high-resolution final image block
- 220 minimal repeating unit of the present invention

What is claimed is:

1. An image sensor for capturing a color image, comprising a two-dimensional array of pixels having a plurality of minimal repeating units wherein each repeating unit is composed of eight pixels having five panchromatic pixels and three pixels having different color responses, the eight pixels of the minimal repeating unit arranged as follows:

| P | B | P | P |
|---|---|---|---|
| A | P | C | P | wherein P represents panchromatic pixels and A, B, and C represent pixels with different color responses and wherein the array of pixels is formed by tiling the minimal repeating unit evenly in rows and with each row shifted one-half of the minimal repeating unit width with respect to the adjacent rows.

2. The image sensor of claim 1 wherein A, B, and C represent pixels with color responses individually selected from red, green, or blue responses.

3. The image sensor of claim 1 wherein A, B, and C represent pixels with color responses that are each respectively red, green, and blue responses.

4. The image sensor of claim 1 wherein A, B, and C represent pixels with color responses individually selected from cyan, magenta, and yellow responses.

5. The image sensor of claim 1 wherein A, B, and C represent pixels with color responses that are each respectively cyan, yellow, and magenta responses.

6. The image sensor of claim 1 wherein the panchromatic pixels comprise pixels of at least two different photographic speeds.

7. The image sensor of claim 6 having the following minimal repeating unit:

| P1 | B  | P1 | P2 |
|----|----|----|----|
| A  | P1 | C  | P1 | wherein P1 represents panchromatic pixels with a first photographic speed; P2 represents a panchromatic pixel with a second photographic speed; and A, B, and C represent pixels with different color responses.

* * * * *